(12) United States Patent
Girard (10) Patent No.: US 10,109,097 B2
(45) Date of Patent: Oct. 23, 2018

(54) DYNAMIC COLLISION AVOIDANCE FOR CROWD SIMULATION OVER STRUCTURED PATHS THAT INTERSECT AT WAYPOINTS

(75) Inventor: Michael Girard, Palo Alto, CA (US)

(73) Assignee: AUTODESK, INC., San Rafael, CA (US)

(*) Notice: Subject to any disclaimer, the term of this patent is extended or adjusted under 35 U.S.C. 154(b) by 571 days.

(21) Appl. No.: 13/556,096

(22) Filed: Jul. 23, 2012

(65) Prior Publication Data
US 2013/0033500 A1    Feb. 7, 2013

Related U.S. Application Data

(60) Provisional application No. 61/513,985, filed on Aug. 1, 2011.

(51) Int. Cl.
| G06T 13/00 | (2011.01) |
| G06T 13/40 | (2011.01) |
| G06T 19/20 | (2011.01) |

(52) U.S. Cl.
CPC ............. *G06T 13/40* (2013.01); *G06T 19/20* (2013.01); *G06T 2207/30241* (2013.01); *G06T 2210/21* (2013.01); *G06T 2219/2004* (2013.01)

(58) Field of Classification Search
CPC ....... G06T 13/00–13/60; G06T 15/00–15/005; G06T 19/00–19/003; G06T 2210/21
USPC .................................................. 345/473–475
See application file for complete search history.

(56) References Cited

U.S. PATENT DOCUMENTS

| 9,355,500 | B2 | 5/2016 | Amkraut et al. |
| 2003/0184603 | A1 | 10/2003 | Marshall et al. |
| 2009/0306946 | A1* | 12/2009 | Badler et al. ..................... 703/2 |
| 2010/0091018 | A1* | 4/2010 | Tatarchuk et al. ............ 345/423 |
| 2010/0134500 | A1* | 6/2010 | Chang ............................ 345/474 |
| 2010/0141666 | A1 | 6/2010 | Christopher et al. |
| 2010/0299065 | A1 | 11/2010 | Mays |
| 2010/0301555 | A1 | 12/2010 | Jubinville et al. |
| 2011/0161060 | A1 | 6/2011 | Kim et al. |

OTHER PUBLICATIONS

Reynolds C. W.: Flocks, herds, and schools: A distributed behavioral model. Proc. SIGGRAPH 87, Computer Graphics 21, 4 (Jul. 1987), 25-34.
Shao W., Terzopoulos D.: Autonomous pedestrians., In Proc. Symposium on Computer Animation (2005), pp. 19-28.
(Continued)

*Primary Examiner* — Charles Tseng
(74) *Attorney, Agent, or Firm* — Artegis Law Group, LLP (57) ABSTRACT

One embodiment of the invention sets forth a technique for identifying and avoiding impending collisions between moving objects in an animation. Paths traversed by the moving objects intersect at pre-determined intersection points. As a moving object approaches an intersection point, a collision avoidance module determines whether the object is on course to collide with another moving object also approaching the intersection point. If a collision is detected, then the collision avoidance module modifies the speed of the moving object to avoid the collision.

21 Claims, 7 Drawing Sheets

(56) References Cited

OTHER PUBLICATIONS

Lee K. H., Choi M. G., Hong Q., Lee J.: Group behavior from video: a data-driven approach to crowd simulation, Proceedings of the 2007 ACM SIGGRAPH/Eurographics symposium on Computer animation, pp. 109-118.
Guy S. J., Chhugani J., Curtis S., Lin M. C., Dubey P., Manocha D.: Pledestrians: A least-effort approach to crowd simulation. In Symposium on Computer Animation (2010), ACM.
Van Den Berg J., Patil S., Sewall J., Manocha D., Lin M.: Interactive navigation of individual agents in crowded environments. Proc. of ACM Symposium on I3D (2008), 139-147.
Treuille A., Cooper S., Popovic Z.: Continuum crowds. Proc. of ACM SIGGRAPH (2006), 1160-1168.
Chenney S.: Flow tiles. Proc. 2004 ACM SIGGRAPH / Eurographics Symposium on Computer Animation (2004).
Guy S., Chhugani J., Kim C., Satish N., Lin, M. C., Manocha D., Dubey P.: Clearpath: Highly parallel collision avoidance for multi-agent simulation. Proc. of Symposium on Computer Animation (2009), 177-187.
Helbing D., Molnar P.: Social force model for pedestrian dynamics. Physical Review E 51 (May 1995), 4282.
Julien Pettré, Jan Ondřej, Anne-Hélène Olivier, Armel Crétual and Stéphane Donikian, Experiment-based Modeling, Simulation and Validation of Interactions between Virtual Walkers, Proceedings of the 2009 ACM SIGGRAPH/ Eurographics Symposium on Computer Animation (SCA'09), 2009.
Jan Ondřej, Julien Pettré, Anne-Hélène Olivier and Stéphane Donikian, A Synthetic-Vision-Based Steering Approach for Crowd Simulation SIGGRAPH '10: ACM SIGGRAPH 2010 Papers, 2010.
Manfred Lau and James Kuffner. 2006. Precomputed Search Trees: Planning for Interactive Goal-Driven Animation: ACM SIGGRAPH/ Eurographics Symposium on Computer Animation (SCA), 299-308.
Ulicny, B., Ciechomski, O., and Thalmann, D. 2004. Crowdbrush: Interactive authoring of real-time crowd scenes. In Proceedings of the 2004 ACM SIGGRAPH/Eurographics symposium on Computer animation, 243-252.
Sung, M., Gleicher, M., and Chenney, S. 2004. Scalable behaviors for crowd simulation. Computer Graphics Forum 23, 3, 519-528.
Mankyu Sung and Lucas Kovar and Michael Gleicher, 2005, Fast and accurate goal-directed motion synthesis for crowds, Proceedings of the 2005 ACM SIGGRAPH/Eurographics symposium on Computer animation.
Ju E., Choi M. G., Park M., Lee J., Lee K. H., Takahashi S.: Morphable crowds. ACM Trans. Graph. 29, 6 (2010), 140.
Non-final Office Action, U.S. Appl. No. 13/563,576, dated Apr. 16, 2014.
Non-final Office Action, U.S. Appl. No. 13/562,183, dated Apr. 24, 2014.
Non-Final Office Action with U.S. Appl. No. 13/563,547, dated Jun. 8, 2015.

\* cited by examiner

DYNAMIC COLLISION AVOIDANCE FOR CROWD SIMULATION OVER STRUCTURED PATHS THAT INTERSECT AT WAYPOINTS

CROSS-REFERENCE TO RELATED APPLICATIONS

This application claims the priority benefit of Provisional U.S. Patent Application Ser. No. 61/513,985, filed Aug. 1, 2011, entitled "Crowd Simulation with Object Avoidance," the subject matter of which is hereby incorporated herein by reference.

BACKGROUND OF THE INVENTION

Field of the Invention

The invention relates generally to the field of computer animation and, more specifically, to dynamic collision avoidance for crowd simulation over structured paths that intersect at waypoints.

Description of the Related Art

Crowd simulation is the process of simulating a crowd having a large number of animated characters placed in a computer-generated crowd area. For the characters in the crowd to appear realistic, crowd simulators typically provide algorithms that attempt to simulate movements of the characters in a realistic manner. Such movements include the characters in the crowd traversing pre-defined paths. Crowd simulators, however, do not account for characters in a crowd colliding with one another when traversing intersecting paths. Thus, as shown in FIG. 1, characters in a crowd simulation often collide with one another when traversing intersecting paths.

Figure 1:
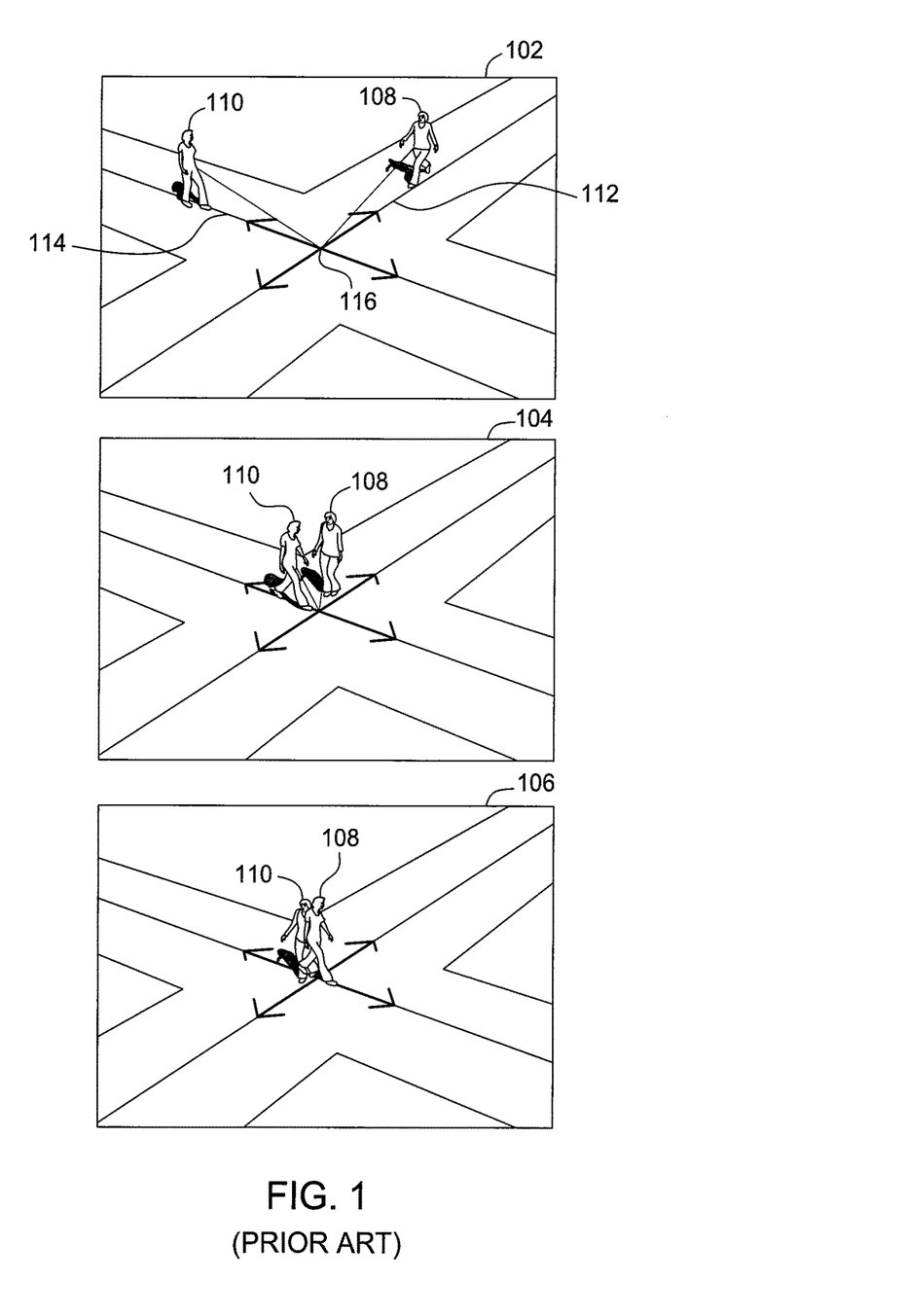
FIG. 1 illustrates different frames of a crowd simulation animation, according to the prior art.

More specifically, FIG. 1 illustrates different frames of a crowd simulation animation 100, according to the prior art. Crowd simulation animation 100 includes frame 102, frame 104 and frame 106. Each frame includes two animated characters, referred to herein as "agents," agent 108 and agent 110. Agent 108 is traversing path 112 and agent 110 is traversing path 114. Path 112 and path 114 intersect at intersection point 116. In frame 102 and frame 104, both agent 108 and agent 110 approach intersection point 114. The speeds at which agent 108 and agent 110 traverse path 112 and path 114 results in a collision of agent 108 and agent 110 at intersection point 116, as shown in frame 106.

Collisions between characters, such as the collision shown in FIG. 1, negatively impact the realism of the crowd simulation because humans, in real life, self-correct their motion to avoid these types of collisions. Therefore, simulations generated by a crowd simulator that do not account for collisions between the different characters in the simulations appear unrealistic.

As the foregoing illustrates, what is needed in the art is a technique that enables collisions between moving objects included in crowd simulation to be avoided.

SUMMARY OF THE INVENTION

One embodiment of the invention sets forth a method for avoiding collisions between a plurality of moving objects included in an animation. The method includes the steps of identifying a set of intersection points in the animation being approached by a first moving object, identifying a set of additional moving objects included in the animation, wherein each moving object in the set of additional moving objects is approaching at least one intersection point in the set of intersection points. The method also includes the steps of determining that the first moving is set to collide with at least one additional moving objects at at least one intersection point in the set of intersection points and modifying a current speed associated with the first moving object in the animation in order to avoid a collision between the first moving object and any moving object in the set of additional moving objects at any intersection point included in the set of intersection points.

One advantage of the disclosed technique is that the motion of an agent in a crowd simulation animation is dynamically corrected at each frame of the animation so that the agent avoids collisions with other agents in the simulation. Consequently, the simulation appears more realistic because the agents in the simulation appear to self-correct their movements based on predicted collisions.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 2:
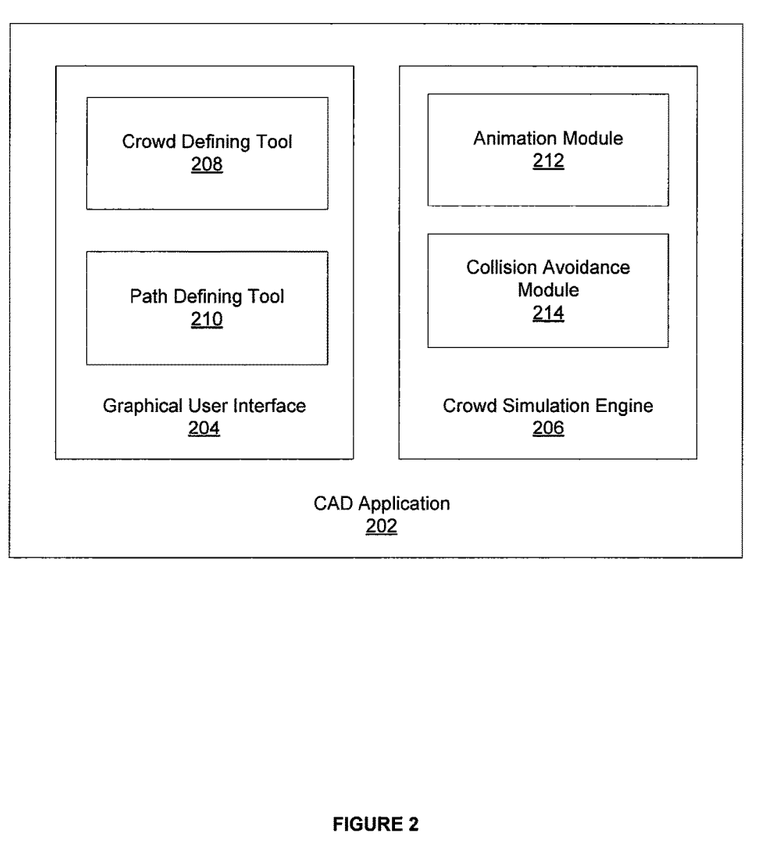
FIG. 2 is a block diagram of a system configured to implement one or more aspects of the invention.

FIG. 2 is a block diagram of a computer-aided design (CAD) application 202 configured to implement one or more aspects of the invention. As shown, CAD application 202 includes a graphical user interface (GUI) 204 and crowd simulation engine 206.

CAD application 202 is a software application that executes on a single computer system or on distributed systems communicating over computer networks such as local area networks or large, wide area networks, such as the Internet. Also, in one embodiment, CAD application 202 is provided as an application program (or programs) stored on computer-readable storage media such as a CD-ROM, DVD-ROM, flash memory module, or other tangible storage media.

GUI 204 included in CAD application 202 is an interface that allows a user to manipulate various interface elements (not shown) to define various aspects of a crowd being simulated. A simulated crowd includes a pre-defined area within which objects (referred to herein as "agents") are placed. The agents within a simulated crowd are animated, such that, when an animation of the simulated crowd is executed, the agents are in motion.

GUI 204 includes crowd defining tool 208 and path defining tool 210. Crowd defining tool 208 allows a user to provide values for different parameters associated with the crowd being simulated. The parameters include the size and shape of the area within which the crowd is to be placed (referred to here as the "crowd area"), the number of agents in the crowd, the types of movements that the agents should perform in the simulation and the length of the simulation. Any other parameters that define the crowd being simulated are within the scope of the invention. For each of the parameters, GUI 204 provides one or more UI elements (not shown) that a user manipulates to provide a value for the parameter. In one embodiment, the UI elements include one or more of slider bars, textual input boxes, radio buttons, check boxes and drawing elements.

Path defining tool 210 allows a user to define one or more paths within the crowd area. A path is typically a set of straight and curved lines. Two or more paths may intersect, where the point of intersection in the crowd area is referred to as a "waypoint." When an animation of the simulated crowd is executed, agents included the crowd traverse the paths defined by the user.

Crowd simulation engine 206 includes animation module 212 and collision avoidance module 214. Animation module 212 generates and executes a crowd simulation animation based on the parameters specified by the user via crowd defining tool 208 and the paths defined by the user via path defining tool 210. The crowd simulation animation includes a series of frames, each frame having a set of agents included in the crowd. Each agent in the crowd simulation animation is in motion and traverses one or more paths defined by the user via path defining tool 210. The path(s) a particular agent traverses is pre-determined and is referred to herein as "the planned path associated with the agent." In one embodiment, the planned path associated with an agent is determined by a user. In an alternate embodiment, the planned path associated with an agent is determined by the animation module 212 when the crowd simulation animation is executed.

Collision avoidance module 214 implements a collision avoidance technique to reduce the number of collisions between agents traversing paths in the crowd simulation animation executed by animation module 212. For each agent in a frame of the crowd simulation animation, collision avoidance module 214 determines whether the agent is on course to collide with another agent at the waypoint in a subsequent frame. If a potential collision is detected, collision avoidance module 214 modifies the speed of the agent to cause the agent to reach the waypoint at a different time than the other agent(s), thereby avoiding the collision.

In operation, collision avoidance module 214 first identifies, for each agent, the waypoints that the agent is to cross as the agent traverses the planned path associated with the agent. For each waypoint that the agent is to cross, collision avoidance module 214 computes an expected time of arrival indicating the time the agent is expected to arrive at the waypoint. Each waypoint is associated with a storage data structure that stores the expected time of arrival for each agent that crosses the waypoint.

At a particular frame of the crowd simulation animation, collision avoidance module 214 identifies a set of waypoints, each of which is a pre-determined distance away from a given agent "I." For a given waypoint "K" in the set of waypoints, collision avoidance module 214 queries the data structure associated with waypoint "K" to identify the expected times of arrival of other agents at waypoint "K." Next, collision avoidance module 214, for every other agent that is to cross waypoint "K," computes a colliding time interval, $P_{jk}$, associated with the agent and waypoint "K." In one embodiment, collision avoidance module 214 computes $P_{jk}$ using the following formula:

$$P_{jk}=[T_{jk\_begin},T_{jk\_end}], \quad \text{Equation (i)}$$

where $T_{jk\_begin}=T_{jk}-D/S_j$, $T_{jk\_end}=T_{jk}+D/S_j$, $T_{jk}$ is the expected time of arrival of the agent, $S_j$ is the speed at which the agent is to cross waypoint "K" and D is a configurable avoidance distance.

Based on the colliding time intervals associated with waypoint "K," collision avoidance module 214 also computes, for each agent that is to cross waypoint "K," a speed interval, $V_{ijk}$ associated with the agent and waypoint "K." In one embodiment, collision avoidance module 214 computes $V_{ijk}$ using the following formula:

$$V_{ijk}=[V_{ijk\_begin},V_{ijk\_end}], \quad \text{Equation (ii)}$$

where $V_{ijk\_begin}=[T_{jk\_begin}/D_{ik}]$ and $V_{ijk\_end}=[T_{jk\_end}/D_{ik}]$ and $D_{ik}$ is the distance between agent "I" and waypoint "K."

Crowd avoidance module 214 then computes, in the manner described above, colliding time intervals and the associated speed intervals for each waypoint in the set of waypoints. Given the speed intervals associated with each waypoint in the set of waypoints, collision avoidance module 214 next generates a set $V_{collide}$ that is a union of all speed intervals, $V_{ijk}$, associated with the set of waypoints, such that speed intervals that overlap are merged.

To determine whether agent "I" is on course to collide with another agent at a waypoint included in the set of waypoints, collision avoidance module 214 determines whether the speed of agent "I," $S_i$, falls within any of the speed intervals included in $V_{collide}$. If the speed of agent "I" does not fall within any of the speed intervals included in $V_{collide}$, then agent "I" is not on course to collide with another agent at any waypoint included in the set of waypoints.

If, however, the speed of agent "I," does fall within one or more of the speed intervals included in $V_{collide}$, then agent "I" is on course to collide with at least one agent at a waypoint included in the set of waypoints. In such a scenario, collision avoidance module 214 computes a new speed for agent "I," where the new speed does not fall within any speed interval included in $V_{collide}$. Collision avoidance module 214 then re-computes the (non-colliding) expected time of arrival of agent "I" at each waypoint in the planned path associated with agent "I" based on the new speed. In one embodiment, the new speed is smoothly interpolated from the current speed of the agent and still ensures the same non-colliding estimated time of arrival.

Collision avoidance module 214 performs the collision avoidance technique described above for each agent at every frame of the crowd simulation animation. As a result, agents in the crowd simulation animation avoid collisions with other agents at waypoints within the crowd area.

Figure 3:
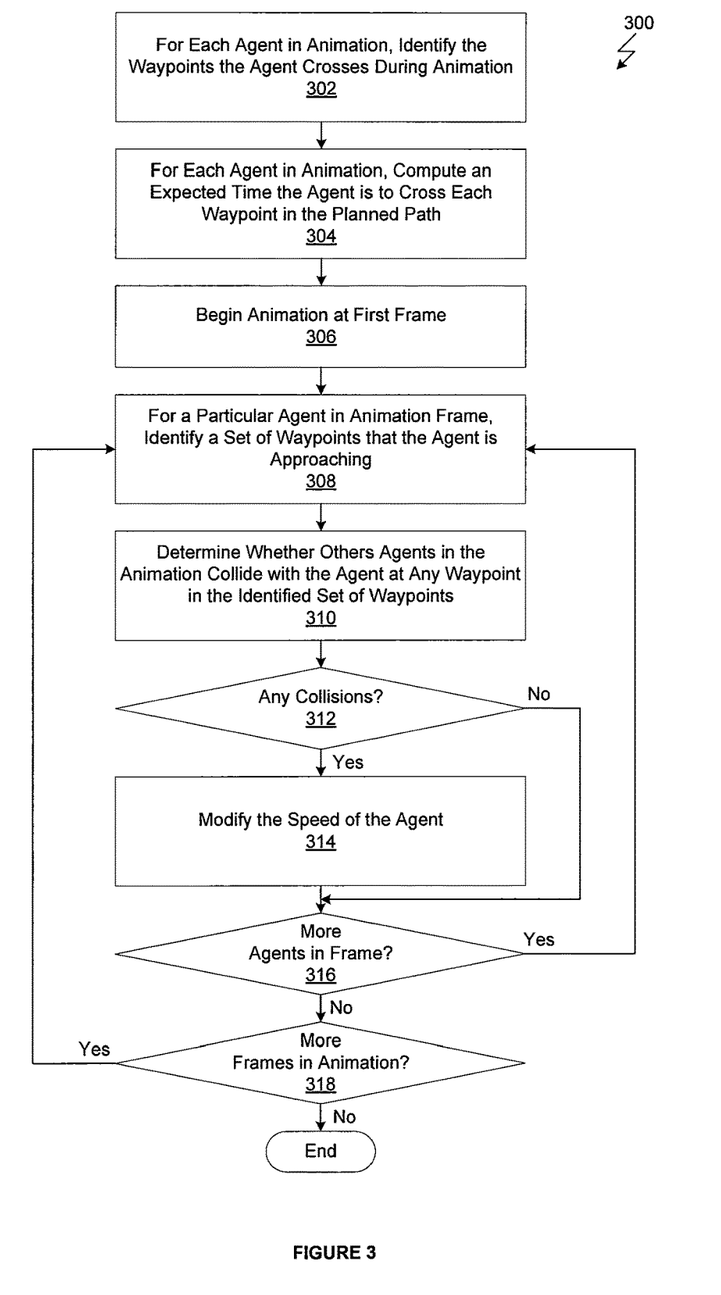
FIG. 3 is a flow diagram of method steps for avoiding object collisions in a crowd simulation animation, according to one embodiment of the invention.

FIG. 3 is a flow diagram of method steps for avoiding collisions in a crowd simulation animation, according to one embodiment of the invention. Although the method steps are described in conjunction with FIG. 2, persons skilled in the art will understand that any system configured to perform the method steps, in any order, falls within the scope of the present invention.

As shown, method 300 begins at step 302, where collision avoidance module 214 identifies, for each agent in a crowd simulation animation, the waypoints that the agent crosses as the agent traverses a planned path during the animation. At step 304, collision avoidance module 214 computes, for each agent in the animation, a set of expected times of arrival indicating the times the agent is expected to arrive at each waypoint that the agent crosses during the animation. Each waypoint is associated with a storage data structure that stores the expected time of arrival for each agent that crosses the waypoint.

At step 306, animation module 212 executes the crowd simulation animation beginning at the first animation frame. At step 308, collision avoidance module 214 identifies, for a particular agent in the crowd simulation animation, a set of waypoints that the agent is approaching. In one embodiment, an agent is approaching a particular waypoint when the agent is within a pre-determined distance of the waypoint.

At step 310, collision avoidance module 214 determines whether any other agents in the crowd simulation animation collide with the agent at any waypoint included in the identified set of waypoints. Step 310 is described in greater detail in conjunction with FIG. 4. At step 312, if collision avoidance module 314 detects one or more collisions, then method 300 proceeds to step 314. At step 314, collision avoidance module 214 modifies the speed of the agent so that the agent arrives at the waypoints at which the collision was to occur at a different time, thus avoiding the collision.

At step 316, if other agents exist in the current frame of the crowd simulation animation that have not been evaluated by the collision avoidance module 214, then method 300 returns to step 308, which is performed for a next agent in the current frame. If, however, at step 316, no other agents exist in the current frame, then method 300 proceeds to step 318.

At step 318, if another frame exists of the crowd simulation animation, then method 300 returns to step 308, which is performed for a first agent in the next frame of the crowd simulation animation. If, however, at step 318, no other frames of the crowd simulation animation exist, then method 300 ends.

Returning now to step 312, if collision avoidance module 314 does not detect any collisions, then method 300 proceeds to step 316, described above.

Figure 4:
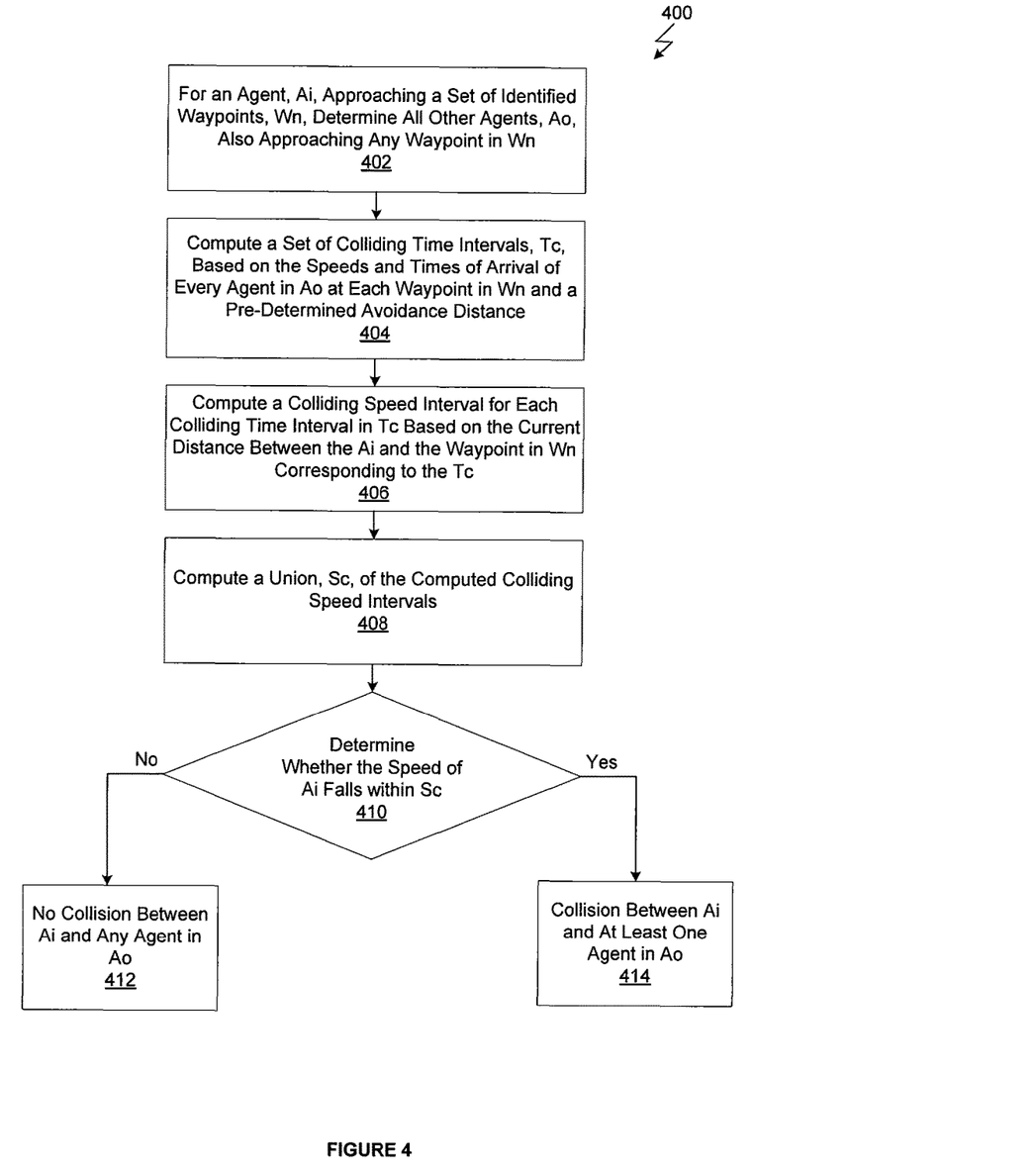
FIG. 4 is a flow diagram of method steps for determining whether a first agent in a crowd simulation animation is on course to collide with other agents in the crowd simulation animation, according to one embodiment of the invention.

FIG. 4 is a flow diagram of method steps for determining whether a first agent in a crowd simulation animation is on course to collide with other agents in the crowd simulation animation, according to one embodiment of the invention. Although the method steps are described in conjunction with FIG. 2, persons skilled in the art will understand that any system configured to perform the method steps, in any order, falls within the scope of the present invention.

As shown, method 400 begins at step 402, where collision avoidance module 214, for a particular agent, Ai, in a crowd simulation animation that is approaching a set of waypoints, Wn, determines a set of agents, Ao, each agent in Ao also approaching at least one waypoint in Wn. In one embodiment, collision avoidance module 214 queries the data structure associated with the waypoints in Wn to identify the expected times of arrival of the others agent at the waypoints. Based on the expected time of arrival, determines that the set of agents Ao are approaching.

At step 404, collision avoidance module 214 computes a set of colliding time intervals, Tc, based on the speeds and times of arrival of every agent in Ao at each waypoint in Wn and a pre-determined avoidance distance. Each colliding time interval in Tc is associated with a different waypoint in Wn. In one embodiment, collision avoidance module 214 computes a colliding time interval in Tc using the Equation (i) shown above.

At step 406, collision avoidance module 214 computes a speed interval for each colliding time interval in Tc based on the current distance between Ai and the waypoint associated with the colliding time interval. In one embodiment, collision avoidance module 214 computes a speed interval using equation (ii) shown above. At step 408, collision avoidance module 214 next generates a set, Sc, that is a union of all speed intervals computed at step 406, such that speed intervals that overlap are merged.

At step 410, collision avoidance module 214 determines whether the current speed of Ai falls within the speed intervals included in Sc. If the speed of Ai does not fall within Sc, then method 400 proceeds to step 412, where collision avoidance module 214 determines that Ai is not on course to collide with any agent in Ao. However, if the speed of Ai falls within the colliding speed interval, then method 400 proceeds to step 414, where collision avoidance module 214 determines that Ai is on course to collide with the at least one agent in Ao in a subsequent frame. Collision avoidance module 214 then modifies the speed of Ai to avoid the collision, as discussed above.

Figure 5A:
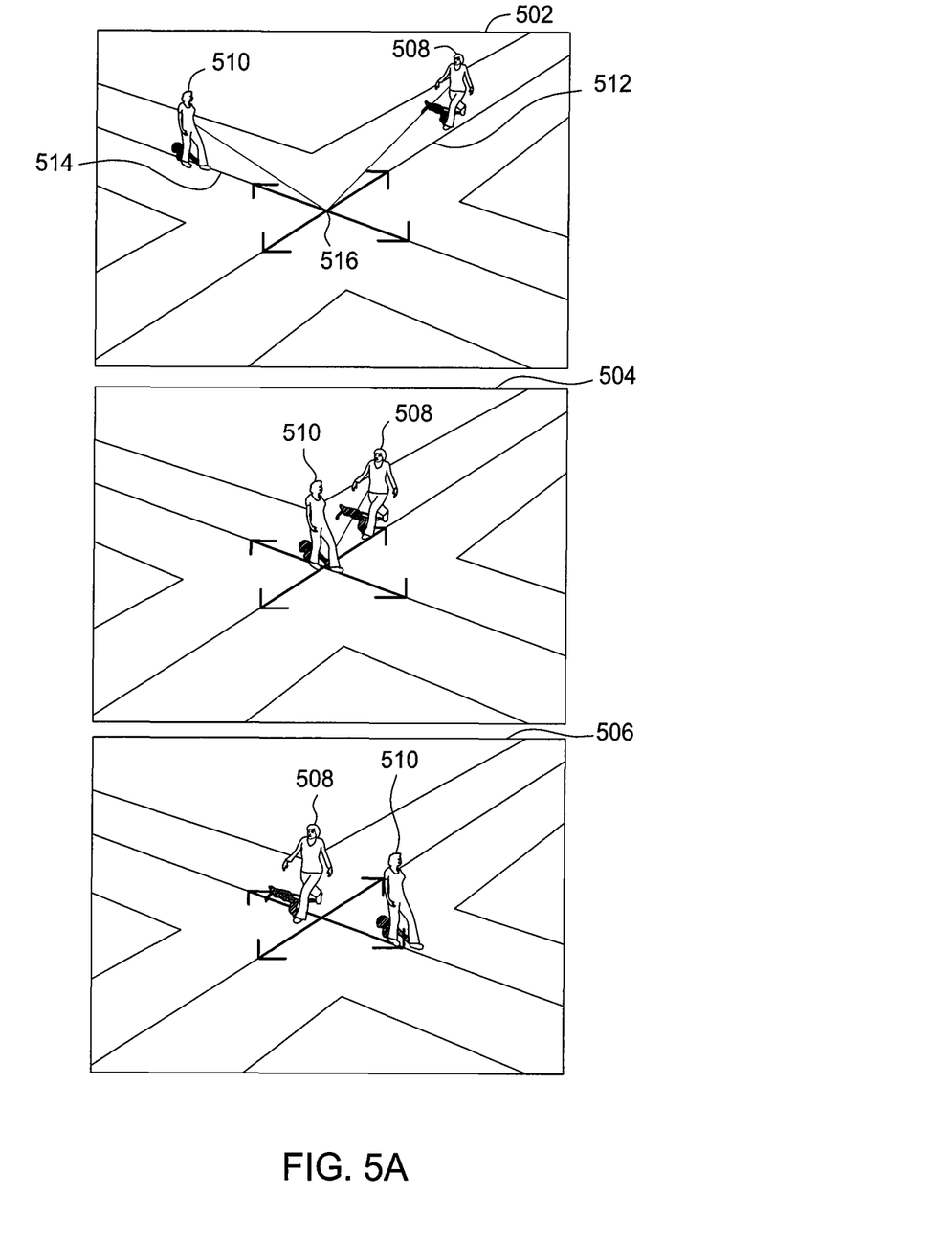
FIG. 5A illustrates frames of a crowd simulation animation including two agents crossing a waypoint, according to one embodiment of the invention.

FIG. 5A illustrates frames 502, 504 and 506 of a crowd simulation animation including two agents 508 and 510 crossing waypoint 516, according to one embodiment of the invention. At frame 502, collision avoidance module 214 determines that agent 508 is approaching waypoint 516 and, given the respective speeds of agent 508 and agent 510, a collision between agent 508 and agent 510 may occur. Collision avoidance module 214 then executes the collision avoidance technique described above in conjunction with FIGS. 2-4 to reduce the speed of agent 508 to avoid the impending collision. Thus, at frame 504, agent 510 crosses waypoint 516 before agent 508 reaches waypoint 516 because agent 508 is now traversing the path at a reduced speed. At frame 506, agent 508 crosses waypoint 516.

Figure 5B:
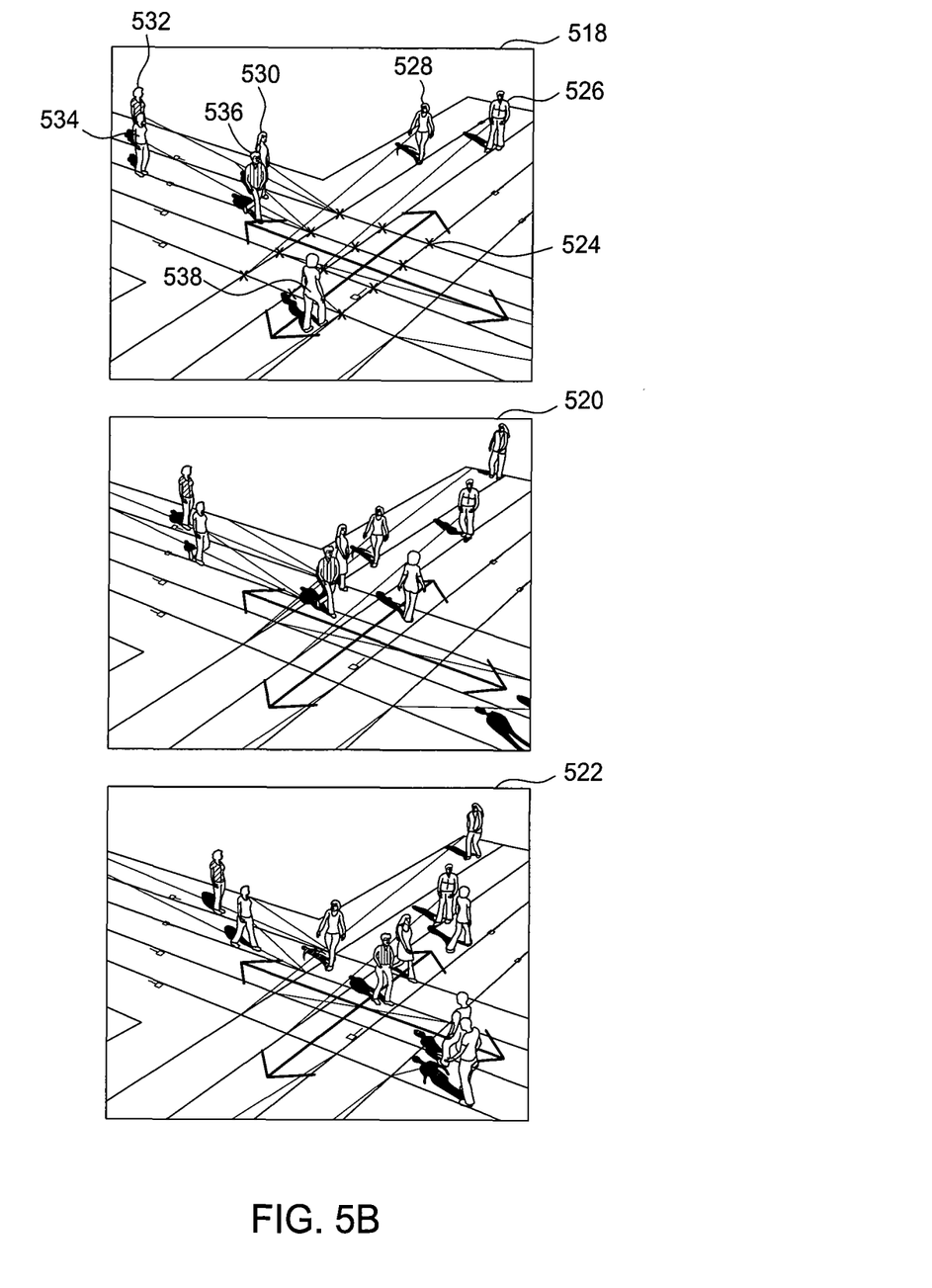
FIG. 5B illustrates frames of a crowd simulation animation including multiple objects crossing multiple waypoints, according to one embodiment of the invention.

FIG. 5B illustrates frames 518, 520 and 522 of a crowd simulation animation including multiple agents crossing the multiple waypoints, according to one embodiment of the invention. As shown in frame 518, the crowd simulation animation includes many agents, such as agents 526, 528, 530, 532, 534 and 538. Each agent is associated with a planned path that the agent is traversing through the crowd simulation animation. The paths of the various agents intersect at various waypoints (identified by "X" in frame 526), such as waypoint 524. The waypoints in FIG. 5B are located at points of intersection of different lanes of a pre-defined path. As each of the agents 526, 528, 530, 532, 534 and 538 approaches the set of waypoints in the intersection that reside on the pre-planned path associated with the agent, collision avoidance module 214 implements the collision avoidance technique described above in conjunction with FIGS. 2-4 to modify the speed of the agent to avoid impending collisions with one or more other agents. Thus, as shown in subsequent frames 520 and 522, none of the agents collides with the others agents in the crowd simulation animation. The planned path associated with each agent may be arbitrary. In one embodiment, a planned path associated with an agent includes the waypoints that reside on the lanes of a left or right turning designated path.

In alternate embodiments, waypoints are arranged by the user on defined paths in any pattern not limited to those shown in FIGS. 5A and 5B.

Figure 6:
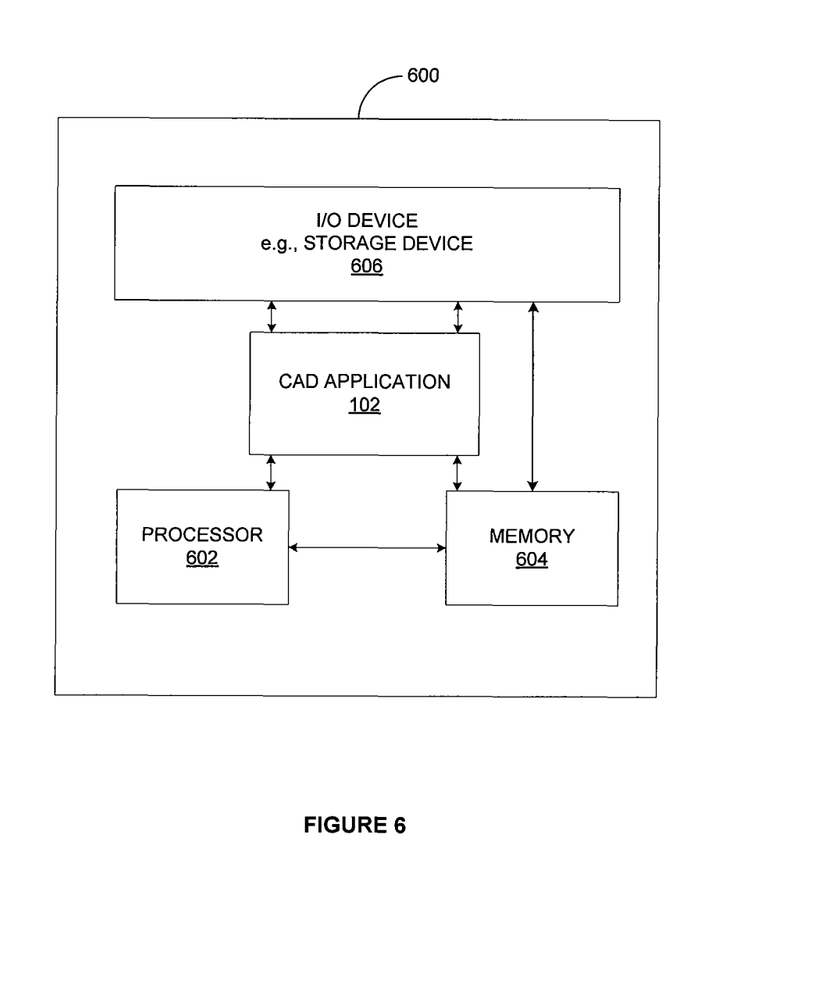
FIG. 6 illustrates a conceptual block diagram of a general purpose computer configured to implement one or more aspects of the invention.

FIG. 6 illustrates a conceptual block diagram of a general purpose computer configured to implement one or more aspects of the invention. As shown, system 600 includes processor element 602 (e.g., a CPU), memory 604, e.g., random access memory (RAM) and/or read only memory (ROM), CAD application 102, and various input/output devices 606, which may include storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

In one embodiment, processor element 602 is a parallel processing engine that is configured to efficiently compute the result of each additional parameter value in parallel. An example of such hardware is a multi-core central processing unit (CPU), a graphics processing unit (GPU), an application-specific integrated circuit (ASIC), a field-programmable gate array (FPGA), or any other processing unit that is configured to execute instructions related to computing different results of each additional parameter value in parallel.

An embodiment of the invention sets forth a technique for identifying and avoiding impending collisions between moving objects in an animation. Paths traversed by the moving objects intersect at pre-determined intersection points. As a moving object approaches an intersection point, a collision avoidance module determines whether the object is on course to collide with another moving object also approaching the intersection point. If a collision is detected, then the collision avoidance module modifies the speed of the moving object to avoid the collision.

One advantage of the disclosed technique is that the motion of an agent in a crowd simulation animation is dynamically corrected at each frame of the animation so that the agent avoids collisions with other agents in the simulation. Consequently, the simulation appears more realistic because the agents in the simulation appear to self-correct their movements based on predicted collisions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for avoiding collisions between a plurality of moving objects included in a computer animation, the method comprising:
    identifying a plurality of intersection points in the computer animation that are being approached by a first moving object that is located at a first location and moving at a first speed;
    identifying two or more additional moving objects that are approaching a first intersection point included in the plurality of intersection points;
    for each of the two or more additional moving objects, determining a collision speed interval based at least on an expected time of arrival for each of the two or more additional moving objects at the first intersection point;
    determining a set of collision speed intervals based on a union of the collision speed intervals associated with the two or more additional moving objects;
    determining, via a processor, that the first moving object is set to collide with at least one additional moving object included in the two or more additional moving objects at the first intersection point based on the first speed and the set of collision speed intervals; and
    modifying the first speed of the first moving object in the computer animation in order to avoid a collision between the first moving object and the at least one additional moving object at the first intersection point.

2. The method of claim 1, further comprising computing an expected time of arrival for the first moving object at each intersection point included in the plurality of intersection points, and computing an expected time of arrival for each additional moving object included in the two or more additional moving objects at each intersection point in the plurality of intersection points.

3. The method of claim 1, wherein determining the collision speed interval comprises computing a collision time interval associated with each of the two or more additional moving objects and the first intersection point based on a configurable avoidance distance and a speed and the expected time of arrival for each of the two or more additional moving objects at the first intersection point.

4. The method of claim 3, wherein determining the collision speed interval further comprises computing the collision speed interval based on the collision time interval and a distance between the first moving object and the first intersection point.

5. The method of claim 1, wherein determining that the first moving object is set to collide comprises determining that the first speed falls within the set of collision speed intervals.

6. The method of claim 5, wherein modifying the first speed comprises computing a new speed that does not fall within the set of collision speed intervals and updating a time of arrival for the first moving object at each intersection point included in the plurality of intersection points based on the new speed.

7. The method of claim 6, wherein the new speed is smoothly interpolated from the first speed.

8. The method of claim 1, wherein each intersection point in the plurality of intersection points is a location in the computer animation at which two or more pre-defined paths in the computer animation intersect.

9. The method of claim 8, wherein a first pre-defined path comprises a first multi-lane path and a second pre-defined path comprises a second multi-lane path, wherein an intersection point is placed on each lane of the first multilane path at a location in the computer animation at which a lane of the second multilane path intersects each lane of the first multi-lane path.

10. A non-transitory computer-readable storage medium storing instructions that, when executed by a processor, cause the processor to execute a computer animation and avoid collisions between a plurality of moving objects included in the computer animation, by performing the steps of:

identifying a plurality of intersection points in the computer animation that are being approached by a first moving object that is located at a first location and moving at a first speed;

identifying two or more additional moving objects that are approaching a first intersection point included in the plurality of intersection points;

for each of the two or more additional moving objects; determining a collision speed interval based at least on an expected time of arrival for each of the two or more additional moving objects at the first intersection point;

determining a set of collision speed intervals based on a union of the collision speed intervals associated with the two or more additional moving objects;

determining that the first moving object is set to collide with at least one additional moving object included in the two or more additional moving objects at the first intersection point based on the first speed and the set of collision speed intervals; and modifying the first speed of the first moving object in the computer animation in order to avoid a collision between the first moving object and the at least one additional moving object at the first intersection point.

11. The non-transitory computer-readable storage medium of claim 10, further comprising computing an expected time of arrival for the first moving object at each intersection point included in the plurality of intersection points, and computing an expected time of arrival for each additional moving object included in the two or more additional moving objects at each intersection point in the plurality of intersection points.

12. The non-transitory computer-readable storage medium of claim 10, wherein determining the collision speed interval comprises computing a collision time interval associated with each of the two or more additional moving objects and the first intersection point based on a configurable avoidance distance and a speed and the expected time of arrival for each of the two or more additional moving objects at the first intersection point.

13. The non-transitory computer-readable storage medium of claim 12, wherein determining the collision speed interval further comprises computing the collision speed interval based on the collision time interval and a distance between the first moving object and the first intersection point.

14. The non-transitory computer-readable storage medium of claim 10, wherein determining that the first moving object is set to collide comprises determining that the first speed falls within the set of collision speed intervals.

15. The non-transitory computer-readable storage medium of claim 14, wherein modifying the first speed comprises computing a new speed that does not fall within the set of collision speed intervals and updating a time of arrival for the first moving object at each intersection point included in the plurality of intersection points based on the new speed.

16. The non-transitory computer-readable storage medium of claim 15, wherein the new speed is smoothly interpolated from the first speed.

17. The non-transitory computer-readable storage medium of claim 10, wherein each intersection point in the plurality of intersection points is a location in the computer animation at which two or more pre-defined paths in the computer animation intersect.

18. The non-transitory computer-readable storage medium of claim 17, wherein a first pre-defined path comprises a first multi-lane path and a second pre-defined path comprises a second multi-lane path, wherein an intersection point is placed on each lane of the first multi-lane path at a location in the computer animation at which a lane of the second multi-lane path intersects each lane of the first multi-lane path.

19. The non-transitory computer-readable storage medium of claim 10, wherein identifying the plurality of intersection points comprises, for each intersection point included in the plurality of intersection points, computing each intersection point based on the first moving object moving from the first location at the first speed.

20. A computer system, comprising:
a memory for storing instructions; and
a processor that is coupled to the memory and, when executing the instructions, is configured to:
identify a plurality of intersection points in a computer animation that are being approached by a first moving object that is located at a first location and moving at a first speed,
identify two or more additional moving objects that are approaching a first intersection point included in the plurality of intersection points,
for each of the two or more additional moving objects, determine a collision speed interval based at least on an expected time of arrival for each of the two or more additional moving objects at the first intersection point,
determine a set of collision speed intervals based on a union of the collision speed intervals associated with the two or more additional moving objects,
determine that the first moving object is set to collide with at least one additional moving object included in the two or more additional moving objects at the first intersection point based on the first speed and the set of collision speed intervals, and
modify the first speed of the first moving object in the computer animation in order to avoid a collision between the first moving object and the at least one additional moving object at the first intersection point.

21. The computer system of claim 20, wherein each intersection point in the plurality of intersection points is a location in the computer animation at which two or more pre-defined paths in the computer animation intersect.

* * * * *

UNITED STATES PATENT AND TRADEMARK OFFICE
CERTIFICATE OF CORRECTION

PATENT NO. : 10,109,097 B2
APPLICATION NO. : 13/556096
DATED : October 23, 2018
INVENTOR(S) : Michael Girard Page 1 of 1

It is certified that error appears in the above-identified patent and that said Letters Patent is hereby corrected as shown below:

In the Claims

Column 9, Claim 9, Line 4, please delete "multilane" and insert --multi-lane--;

Column 9, Claim 9, Line 6, please delete "multilane" and insert --multi-lane--;

Column 9, Claim 10, Line 21, please delete ";" and insert --,--.

Signed and Sealed this
Twenty-fifth Day of December, 2018

Andrei Iancu
*Director of the United States Patent and Trademark Office*